US009834134B2

(12) United States Patent
Wasilewski et al.

(10) Patent No.: US 9,834,134 B2
(45) Date of Patent: Dec. 5, 2017

(54) LIGHT ASSEMBLY

(71) Applicant: GM GLOBAL TECHNOLOGY OPERATIONS LLC, Detroit, MI (US)

(72) Inventors: Andrzej Wasilewski, Shelby Township, MI (US); Candice M. Willett, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 148 days.

(21) Appl. No.: 14/977,968

(22) Filed: Dec. 22, 2015

(65) Prior Publication Data

US 2017/0174121 A1    Jun. 22, 2017

(51) Int. Cl.
  *F21V 19/02*    (2006.01)
  *B60Q 1/04*    (2006.01)

(52) U.S. Cl.
  CPC .................................... *B60Q 1/04* (2013.01)

(58) Field of Classification Search
  CPC   B60Q 2200/00; B60Q 2200/30; B60Q 23/00; B60Q 23/05; B60Q 1/02; B60Q 1/26
  See application file for complete search history.

(56) References Cited

U.S. PATENT DOCUMENTS

| 6,476,726 B1* | 11/2002 | Pederson | B60Q 1/2611 |
| | | | 340/693.5 |
| 2008/0198617 A1* | 8/2008 | Schwab | B60Q 1/076 |
| | | | 362/545 |

* cited by examiner

*Primary Examiner* — Ali Alavi
(74) *Attorney, Agent, or Firm* — Quinn IP Law

(57) ABSTRACT

A light assembly includes a first carrier and a second carrier. The assembly also includes a first light module attached to the first carrier such that the first carrier and the first light module are movable in unison between a use position in which the first light module is operable to emit light and a storage position in which the first light module does not operate to emit light. The assembly further includes a second light module attached to the second carrier such that the second carrier and the second light module are movable in unison between a first position when the first light module is in the storage position and a second position when the first light module is in the use position. The second light module is operable to emit light when in at least one of the first and second positions.

20 Claims, 3 Drawing Sheets

LIGHT ASSEMBLY

TECHNICAL FIELD

The present disclosure relates to a light assembly.

BACKGROUND

Vehicles generally utilize a headlight to light an area. Generally, headlights are utilized at night to increase visibility but some headlights utilize lights during the day, which can be referred to as daylights.

SUMMARY

The present disclosure provides a light assembly including a first carrier and a second carrier. The assembly also includes a first light module attached to the first carrier such that the first carrier and the first light module are movable in unison axially relative to a first axis between a use position in which the first light module is operable to emit light and a storage position in which the first light module does not operate to emit light. The assembly further includes a second light module attached to the second carrier such that the second carrier and the second light module are movable in unison axially relative to a second axis between a first position when the first light module is in the storage position and a second position when the first light module is in the use position. The second light module is operable to emit light when in at least one of the first and second positions, and the first and second axes are transverse to each other.

The present disclosure also provides another light assembly including a housing and a lens supported by the housing. The lens cooperates with the housing to define an interior region. The assembly also includes a first carrier disposed within the interior region and a second carrier disposed within the interior region. The assembly further includes a first light module disposed within the interior region and attached to the first carrier such that the first carrier and the first light module are movable in unison between a use position in which the first light module is operable to emit light and a storage position in which the first light module does not operate to emit light. The assembly also includes a second light module disposed within the interior region and attached to the second carrier such that the second carrier and the second light module are movable in unison between a first position when the first light module is in the storage position and a second position when the first light module is in the use position. In addition, the assembly includes a third light module disposed within the interior region and attached to the second carrier to position the second and third light modules apart from each other. The third light module is movable in unison with the second light module between the first and second positions. The second light module does not operate to emit light when in the first position and the third light module is operable to emit light when in the first position. Furthermore, the second light module is operable to emit light when in the second position and the third light module does not operate to emit light when in the second position. The second and third light modules are disposed between the lens and the first light module when the first light module is in the storage position and the second and third light modules are disposed in the first position.

The detailed description and the drawings or Figures are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the figures to aid the reader's understanding, and do not represent limitations (for example, to the position, orientation, or use, etc.) on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges.

Figure 1:
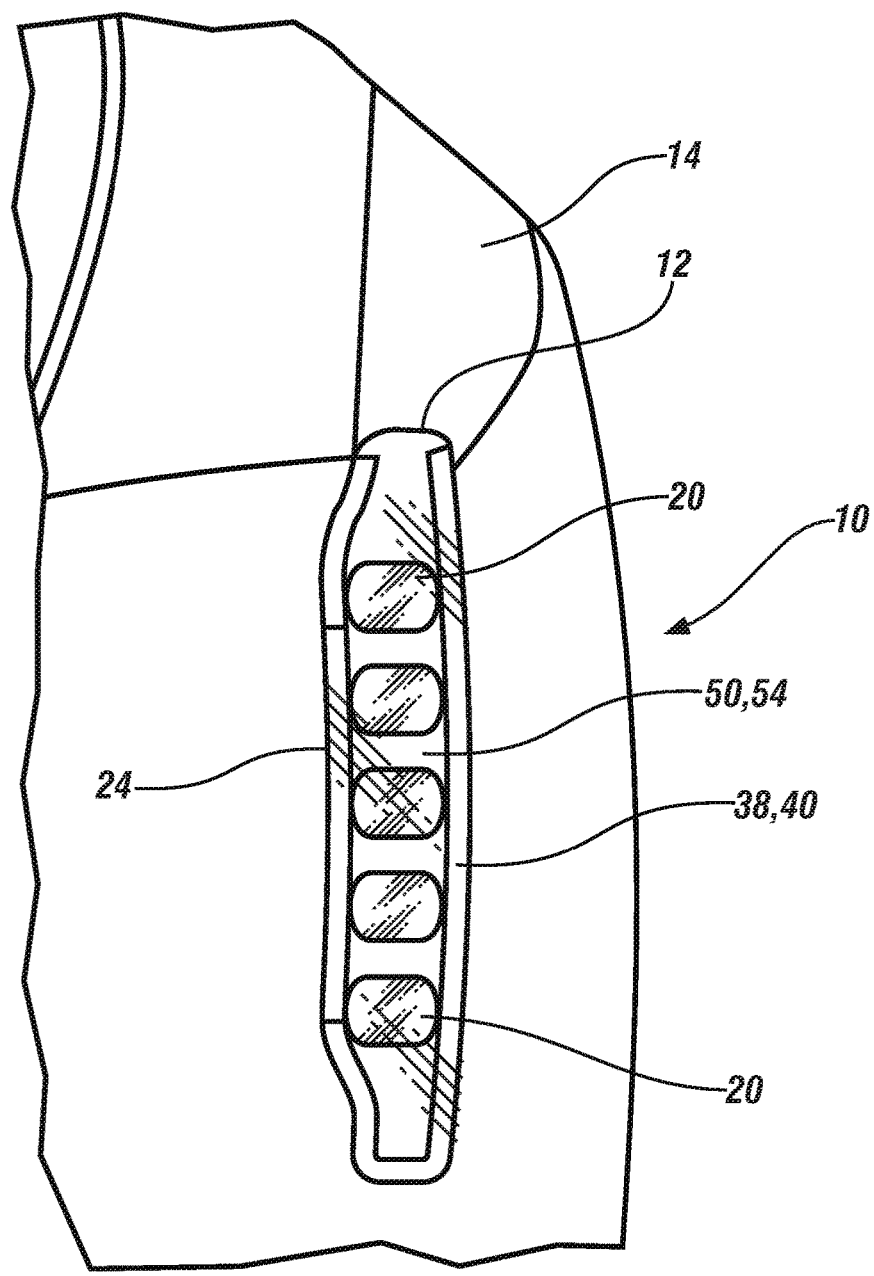
FIG. 1 is a schematic fragmentary front view of a light assembly configured to cooperate with a vehicle, with a first light module in a use position, and a second light module and a third light module in a second position.

Referring to the Figures, wherein like numerals indicate like or corresponding parts throughout the several views, a light assembly 10 is generally shown in FIG. 1.

The light assembly 10 can include a housing 12. The housing 12 can be attached to another structure 14. For example, the housing 12 can be configured for attachment to a structure 14 of a vehicle. The housing 12 can be any suitable configuration and can include one or more pieces.

The light assembly 10 can be utilized in a vehicle application or non-vehicle application. Non-limiting examples of vehicles can include cars, trucks, motorcycles, boats, watercrafts, all-terrain vehicles, off-road vehicles, aircrafts, farm equipment or any other suitable vehicle. Non-limiting examples of non-vehicles can include machines, billboard signs, spotlights, farm equipment or any other suitable non-vehicle.

Figure 2:
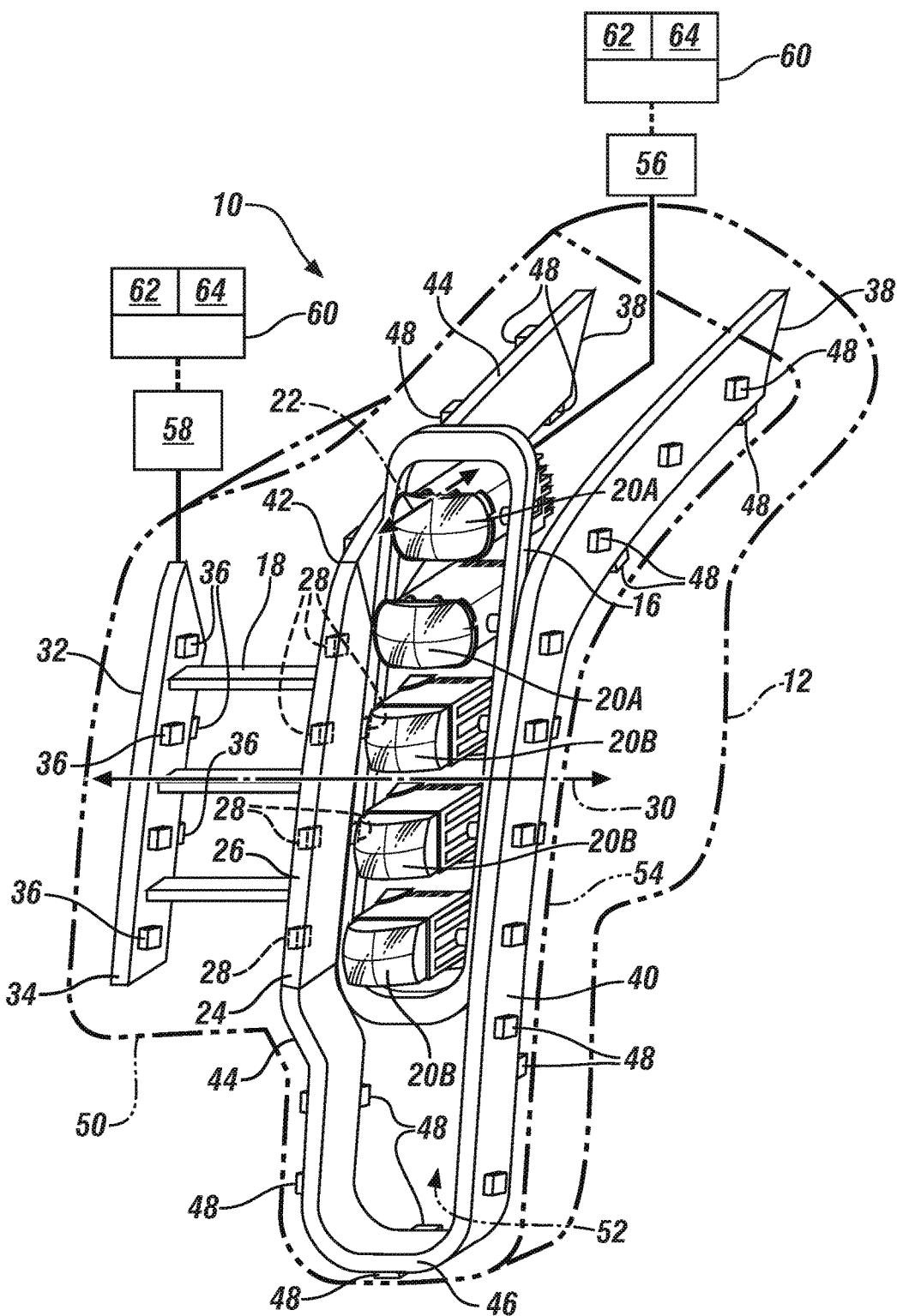
FIG. 2 is a schematic perspective view of the first light module in the use position, and the second and third light modules in the second position, with a housing and a lens shown in phantom lines.
Figure 3:
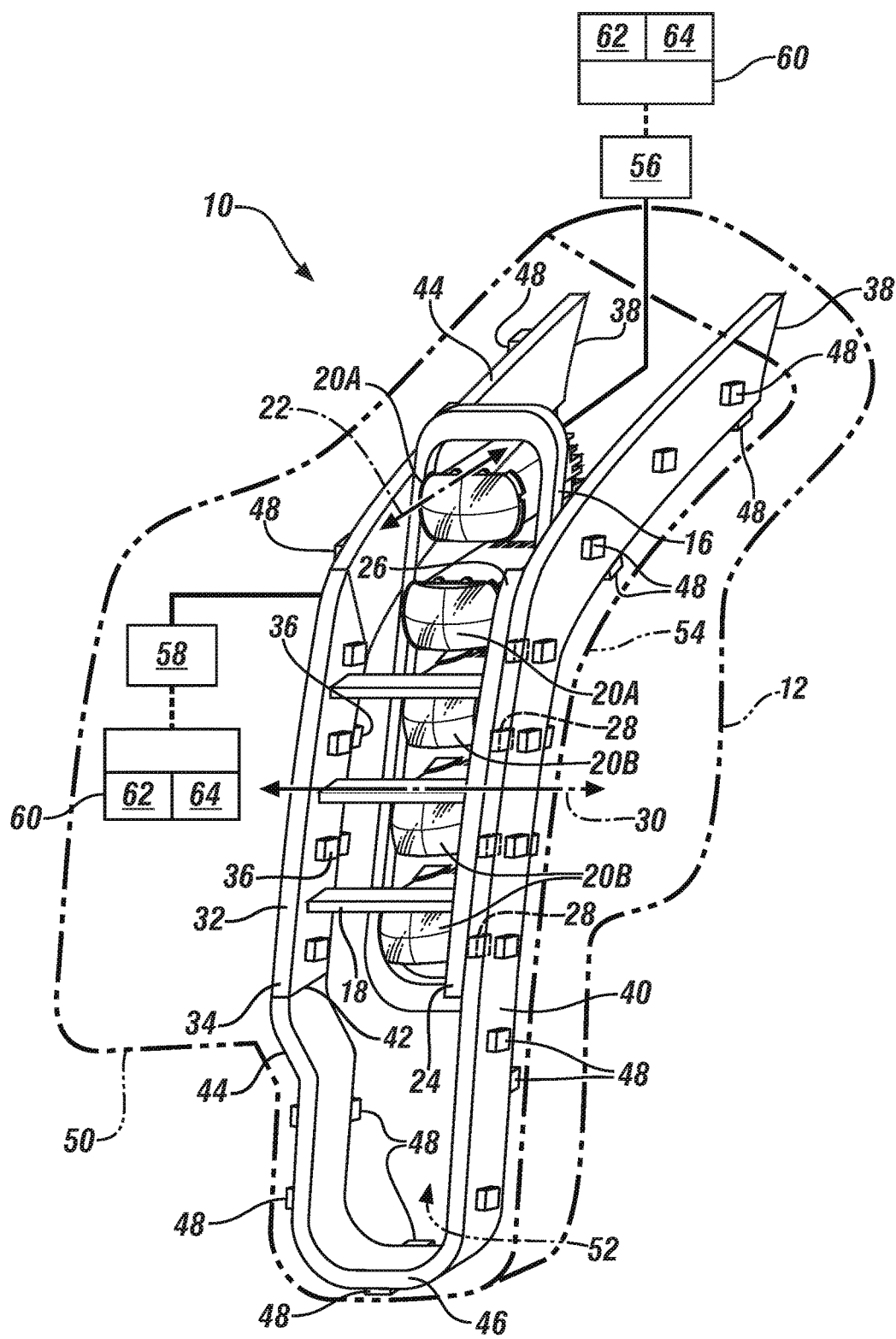
FIG. 3 is a schematic perspective view of the first light module in a storage position, and the second and third light modules in a first position, and the housing and the lens shown in phantom lines.

Turning to FIGS. 2 and 3, the light assembly 10 includes a first carrier 16 and a second carrier 18. Generally, the first and second carriers 16, 18 are movable relative to the housing 12. As discussed further below, the first and second carriers 16, 18 can move independently of each other, and can move in different directions from each other.

Continuing with FIGS. 2 and 3, the light assembly 10 further includes a first light module 20 attached to the first carrier 16. Therefore, generally, the first light module 20 is supported by the first carrier 16. The first light module 20 and the first carrier 16 are attached to each other such that the first carrier 16 and the first light module 20 are movable in unison between a use position in which the first light module 20 is operable to emit light and a storage position in which the first light module 20 does not operate to emit light. More specifically, the first carrier 16 and the first light module 20 are movable in unison axially relative to a first axis 22 between the use position in which the first light module 20 is operable to emit light and the storage position in which the first light module 20 does not operate to emit light. The use position is shown in FIGS. 1 and 2, and the storage position is shown in FIG. 3. Generally, the first light module 20 can be in the use position when it is desirable to operate the first light module 20 to emit light. For example, the first light module 20 can be operated during the night or dusk to emit light.

In certain embodiments, the first light module 20 can include a plurality of first light modules 20 each attached to the first carrier 16 and stacked generally in a row relative to each other along the first carrier 16. The first light modules 20 are movable with the first carrier 16 between the use and storage positions (compare FIGS. 2 and 3). Therefore, generally, each of the first light modules 20 is supported by the first carrier 16. The first light module(s) 20 can be attached to the first carrier 16 in any suitable manner. It is to be appreciated that one or more of the first light modules 20 can be disposed substantially parallel to the first axis 22, and furthermore, the first carrier 16 and the first light modules 20 can move in unison substantially parallel to the first axis 22.

The first light modules 20 can be split into separate groups that operate for high beams or low beams. Therefore, one or more first light modules 20 can operate when high beams are desired, and one or more first light modules 20 can operate when low beams are desired. For illustrative purposes only, two of the first light modules 20 are low beam light modules 20A and the other three of the first light modules 20 are high beam light modules 20B. Each of the first light modules 20 (including the low beam light modules 20A and the high beam light modules 20B shown in the Figures) is attached to the first carrier 16, and is operable to emit light when in the use position. The high and low beam light modules 20A, 20B are organized in a row along the first carrier 16. It is to be appreciated that any suitable number of first light modules 20 can be utilized, and the Figures are illustrative of one example.

The first light modules 20, including both the low beam light modules 20A and the high beam light modules 20B are referred to generally by the reference numeral 20, whereas the low beam light modules 20A are referred to specifically with the reference numeral 20A, and the high beam light modules 20B are referred to specifically by the reference numeral 20B. The first light module(s) 20 can include a light emitting diode (LED). Therefore, for example, each of the low beam light modules 20A and the high beam light modules 20B can include the LED. It is to be appreciated that the first light module(s) 20, which includes low beam light modules 20A and the high beam light modules 20B, can include other types of light producing modules instead of LED.

Continuing with FIGS. 2 and 3, the light assembly 10 also includes a second light module 24 attached to the second carrier 18. Therefore, generally, the second light module 24 is supported by the second carrier 18. The second light module 24 can be attached to the second carrier 18 in any suitable manner.

The second light module 24 can include a first body 26 and a first LED 28 secured to the first body 26. The first LED 28 can emit light to light the first body 26 when the second light module 24 is in one of the first and second positions. In certain embodiments, the first LED 28 can include a plurality of first LEDs 28 secured to the first body 26. The first LEDs 28 can be disposed along the first body 26 in any suitable location, and FIGS. 2 and 3 are non-limiting examples of the first LEDs 28 being disposed along different sides of the first body 26. Therefore, the first LEDs 28 can be disposed along at least one of a back side, a front side, a left side and a right side of the first body 26. Furthermore, the first LEDs 28 can be at least partially disposed inside the first body 26 or can be spaced from the inside of the first body 26. Therefore, the first LEDs 28 can light the first body 26 from inside and/or outside of the first body 26. It is to be appreciated that the second light module 24 can include other types of light producing modules instead of LED. It is also to be appreciated that one or more of the first LEDs 28 can be secured to a support to provide a subassembly that can be secured to the first body 26 as a unit. Additionally, the support can include a plurality of supports, with one or more first LEDs 28 secured to each of the supports. Optionally, the second light module 24 can include a light tube, and the first LED(s) 28 light the light tube.

The second light module 24 and the second carrier 18 are attached to each other such that the second carrier 18 and the second light module 24 are movable in unison between a first position when the first light module 20 is in the storage position and a second position when the first light module 20 is in the use position. More specifically, the second carrier 18 and the second light module 24 are movable in unison axially relative to a second axis 30 between the first position when the first light module 20 is in the storage position and the second position when the first light module 20 is in the use position. Additionally, when the second light module 24 moves between the first and second positions, correspondingly, the first LED(s) 28 and the first body 26 move in unison with the second carrier 18. The first position of the second light module 24 is shown in FIG. 3, and the second position of the second light module 24 is shown in FIGS. 1 and 2.

The second light module 24 is operable to emit light when in at least one of the first and second positions. In certain embodiments, the second light module 24 does not operate to emit light when in the other one of the first and second positions. Therefore, for example, the second light module 24 can operate to emit light when in the second position and the second light module 24 does not operate to emit light when in the first position. Generally, for example, the second light module 24 can be in the second position when it is desirable to operate the second light module 24 to emit light. For example, the second light module 24 can be operated during the night or dusk to emit light when in the second position. Therefore, in certain embodiments, the second light module 24 does not operate to emit light, which can be during the day, when in the first position.

As discussed above, the first light module 20 is movable along the first axis 22 and the second light module 24 is movable along the second axis 30. Generally, the first and second axes 22, 30 are transverse to each other. In certain embodiments, the first and second axes 22, 30 are substantially perpendicular to each other. Therefore, for example, the first and second light modules 20, 24 are movable transverse to each other, and more specifically in certain embodiments, substantially perpendicular to each other. As such, the first and second light modules 20, 24 move back and forth in different directions.

Continuing with FIGS. 2 and 3, in certain embodiments, the light assembly 10 can include a third light module 32 attached to the second carrier 18 and spaced apart from the second light module 24. Therefore, the third light module 32 is attached to the second carrier 18 to position the second and third light modules 24, 32 apart from each other. For example, the second and third light modules 24, 32 can be spaced substantially parallel to each other. The third light module 32 can be attached to the second carrier 18 in any suitable manner. It is to be appreciated that the second and third light modules 24, 32 can move in unison substantially parallel to the second axis 30, and furthermore, the second carrier 18 can move substantially parallel to the second axis 30.

The third light module 32 can include a second body 34 and a second LED 36 secured to the second body 34. The second LED 36 can emit light to light the second body 34 when the third light module 32 is in one of the first and second positions. In certain embodiments, the second LED 36 can include a plurality of second LEDs 36 secured to the second body 34. The second LEDs 36 can be disposed along the second body 34 in any suitable location, and FIGS. 2 and 3 are non-limiting examples of the second LEDs 36 being disposed along different sides of the second body 34. Therefore, the second LEDs 36 can be disposed along at least one of a back side, a front side, a left side and a right side of the second body 34. Furthermore, the second LEDs 36 can be at least partially disposed inside the second body 34 or can be spaced from the inside of the second body 34. Therefore, the second LEDs 36 can light the second body 34 from inside and/or outside of the second body 34. It is to be appreciated that the third light module 32 can include other types of light producing modules instead of LED. It is also to be appreciated that one or more of the second LEDs 36 can be secured to a support to provide a subassembly that can be secured to the second body 34 as a unit. Additionally, the support can include a plurality of supports, with one or more second LEDs 36 secured to each of the supports. Optionally, the third light module 32 can include a light tube, and the second LED(s) 36 light the light tube.

Generally, the third light module 32 is movable in unison with the second light module 24 between the first and second positions. More specifically, the third light module 32 is movable with the second carrier 18 and the second light module 24 in unison axially relative to the second axis 30 between the first and second positions. Additionally, when the third light module 32 moves between the first and second positions, correspondingly, the second LED(s) 36 and the second body 34 move in unison with the second carrier 18. The first position of the third light module 32 is shown in FIG. 3, and the second position of the third light module 32 is best shown in FIG. 2.

As discussed above, the second light module 24 operates to emit light when in at least one of the first and second positions. In certain embodiments, the second light module 24 does not operate to emit light when in the first position and the third light module 32 is operable to emit light when in the first position, and correspondingly, the second light module 24 is operable to emit light when in the second position and the third light module 32 does not operate to emit light when in the second position.

Continuing with FIGS. 2 and 3, the light assembly 10 can also include a fourth light module 38 supported by the housing 12. Specifically, the fourth light module 38 is supported by the housing 12 such that the fourth light module 38 is stationary relative to the housing 12. In other words, the fourth light module 38 is not movable relative to the housing 12. The fourth light module 38 can be attached to the housing 12 or any other structure 14 to remain stationary relative to the housing 12.

The fourth light module 38 can emit light regardless of the positions of the first, second and third light modules 20, 24, 32. Therefore, the fourth light module 38 can emit light during the day and the night. Optionally, the light being emitted from the fourth light module 38 can be dimmed when the first light module 20 is in the use position. Also optionally, the light emitted from the second light module 24 can be dimmed when the first light module 20 is in the use position. The fourth light module 38 can include a LED. It is to be appreciated that the fourth light module 38 can include other types of light producing modules instead of LED.

Referring to FIG. 2, the fourth light module 38 can include a first segment 40 disposed between the housing 12 and the second light module 24. Generally, the second light module 24 can be disposed closer to the first segment 40 of the fourth light module 38 when in the first position than when in the second position (see FIG. 3). Furthermore, the second light module 24 can be disposed farther from the first segment 40 of the fourth light module 38 when in the second position than when in the first position (see FIG. 2). Additionally, as best shown in FIG. 2, at least a portion of the first light module 20 can be disposed between the second light module 24 and the first segment 40 of the fourth light module 38 when the first light module 20 is in the use position and the second light module 24 is in the second position.

Referring to FIGS. 2 and 3, the fourth light module 38 can define an opening 42. The third light module 32 can be disposed in the opening 42 when the second and third light modules 24, 32 are in the first position (see FIG. 3). Furthermore, the second light module 24 can be disposed in the opening 42 when the second and third light modules 24, 32 are in the second position (see FIG. 2). Generally, the second light module 24 can align in the opening 42 when the second light module 24 is in the second position, and the third light module 32 can align in the opening 42 when the third light module 32 is in the first position.

Continuing with FIGS. 2 and 3, the fourth light module 38 can include a second segment 44 spaced from the first segment 40 by a transition segment 46. Therefore, the first and second segments 40, 44 can be disposed generally parallel to each other, and the transition segment 46 can be disposed transverse to the first and second segments 40, 44. In certain embodiments, the second segment 44 can define the opening 42. The third light module 32 can be disposed in the opening 42 of the second segment 44 when the second and third light modules 24, 32 are in the first position (see FIG. 3). Furthermore, the second light module 24 can be disposed in the opening 42 of the second segment 44 when the second and third light modules 24, 32 are in the second position (see FIG. 2).

The fourth light module 38 can include a third LED 48 secured to at least one of the first, second and transition segments 40, 44, 46. The third LED 48 can emit light to light one or more of the first, second and transition segments 40, 44, 46. In certain embodiments, the third LED 48 can include a plurality of third LEDs 48 secured to one or more of the first, second and transition segments 40, 44, 46. The third LEDs 48 can be disposed along the first, second and transition segments 40, 44, 46 in any suitable location, and FIGS. 2 and 3 are non-limiting examples of the third LEDs 48 being disposed along different sides of the first, second and transition segments 40, 44, 46. Therefore, the third LEDs 48 can be disposed along at least one of a back side, a front side, a left side and a right side of the first, second and transition segments 40, 44, 46. Furthermore, the third LEDs 48 can be at least partially disposed inside the first, second and transition segments 40, 44, 46 or can be spaced from the inside of the first, second and transition segments 40, 44, 46. Therefore, the third LEDs 48 can light the first, second and transition segments 40, 44, 46 from inside and/or outside of the first, second and transition segments 40, 44, 46. It is to be appreciated that the fourth light module 38 can include other types of light producing modules instead of LED. It is also to be appreciated that one or more of the third LEDs 48 can be secured to a support to provide a subassembly that can be secured to the first, second and/or transition segments 40, 44, 46 as a unit. Additionally, the support can include a plurality of supports, with one or more third LEDs 48 secured to each of the supports. Optionally, the fourth light module 38 can include a light tube, and the third LED(s) 48 light the light tube.

Again continuing with FIGS. 2 and 3, the light assembly 10 can include a lens 50 supported by the housing 12. More specifically, the lens 50 can be attached to and supported by the housing 12. The lens 50 can be any suitable configuration and can include one or more pieces. Generally, the lens 50 can be manufactured from a transparent material, such as but not limited to a polycarbonate material. The lens 50 provides a front cover for the components of the light assembly 10, and allows the light to pass therethrough.

Generally, the lens 50 can cooperate with the housing 12 to define an interior region 52. The housing 12 and the lens 50 can cooperate with each other to enclose the interior region 52 therebetween, which encloses the components of the light assembly 10 and protects the components from moisture, dirt, and debris. Some of the components disposed in the interior region 52 are discussed below. It is to be appreciated that other components of the light assembly 10, not specifically described herein, can also be disposed in the interior region 52.

The first and second light modules 20, 24 can be disposed within the interior region 52. Furthermore, the third and fourth light modules 32, 38 can also be disposed within the interior region 52. In addition, the first and second carriers 16, 18 can be disposed within the interior region 52. Generally, as shown in FIG. 3, the second and third light modules 24, 32 are disposed between the lens 50 and the first light module 20 when the first light module 20 is in the storage position and the second and third light modules 24, 32 are disposed in the first position. The first light module(s) 20 generally align with the lens 50. Therefore, when the first light module(s) 20 are operating to emit light, the light is directed through the lens 50.

Referring to FIG. 1, the lens 50 can include a face 54 aligning with the first light module 20. Therefore, when the first light module(s) 20 are operating to emit light, the light is directed through the face 54 of the lens 50. The first light module 20 can be disposed closer to the face 54 of the lens 50 when in the use position than when in the storage position (see FIG. 2). Furthermore, the first light module 20 can be disposed farther from the face 54 of the lens 50 when in the storage position than when in the use position (see FIG. 3).

As shown in FIG. 3, at least a portion of the second carrier 18 can be disposed between the lens 50 and the first light module 20 when the first light module 20 is in the storage position and the second light module 24 is disposed in the first position. Furthermore, as shown in FIG. 2, at least a portion of the second light module 24 can be disposed between the first light module 20 and the lens 50 when the first light module 20 is in the storage position and the second light module 24 is in the first position.

Generally, the light assembly 10 can further include one or more actuators configured to move the first and second carriers 16, 18, and thus the first, second and third modules 20, 24, 32 between various positions. For example, the actuators can include a first motor 56 and a second motor 58. The first motor 56 can be coupled to the first carrier 16 and configured to move the first light module 20 and the first carrier 16 between the use and storage positions. The second motor 58 can be coupled to the second carrier 18 and configured to move the second light module 24 and the second carrier 18 between the first and second positions. The actuator(s) can be any suitable configuration and include one or more pieces to move the first and second carriers 16, 18.

One or more controllers 60 can be utilized to control the actuator(s). As such, one or more controllers 60 can be utilized to selectively actuate the first and second motors 56, 58. Therefore, for example, one controller 60 can control the first and second motors 56, 58. As another example, one controller 60 can control the first motor 56 and another controller 60 can control the second motor 58. When utilizing a plurality of controllers 60, the controllers 60 can optionally communicate with each other.

The controller(s) 60 can include a processor 62 and a memory 64 on which is recorded instructions for controlling the actuator(s), and more specifically, the first and second motors 56, 58. The controller(s) 60 can control other components not specifically discussed herein and/or be in electrical communication with another controller(s). The controller(s) 60 is configured to execute the instructions from the memory 64, via the processor 62. For example, the controller(s) 60 can be a host machine or distributed system, e.g., a computer such as a digital computer or microcomputer, and/or as a proportional-integral-derivative (PID) controller device having the processor 62, and, as the memory 64, tangible, non-transitory computer-readable memory such as read-only memory (ROM) or flash memory. The controller(s) 60 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller(s) 60 can include all software, hardware, memory 64, algorithms, connections, sensors, etc., necessary to control the actuator(s), and specifically, the first and second motors 56, 58. As such, a control method operative to control the actuator(s), and specifically the first and second motors 56, 58, can be embodied as software or firmware associated with the controller(s) 60. It is to be appreciated that the controller(s) 60 can also include any device capable of analyzing data from various sensors, comparing data, making the necessary decisions required to control and monitor the actuator(s), and specifically, the first and second motors 56, 58.

The controller(s) 60 can also be in communication with the first, second, third and/or fourth light modules 20, 24, 32, 38. Therefore, the controller(s) 60 can signal to the first, second, third and/or fourth light modules 20, 24, 32, 38 to turn the light on and off. Alternatively, one or more other controllers can be in communication with one or more of the first, second, third and/or fourth light modules 20, 24, 32, 38. Therefore, the other controller(s) can signal to the first, second, third and/or fourth light modules 20, 24, 32, 38 to turn the light on and off. The other controllers can include a processor 62 and a memory 64 as discussed above for controller 60, and will not be repeated.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other.

Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A light assembly comprising:
a first carrier;
a first light module attached to the first carrier such that the first carrier and the first light module are movable in unison axially relative to a first axis between a use position in which the first light module is operable to emit light and a storage position in which the first light module does not operate to emit light;
a second carrier; and
a second light module attached to the second carrier such that the second carrier and the second light module are movable in unison axially relative to a second axis between a first position when the first light module is in the storage position and a second position when the first light module is in the use position, and wherein the second light module is operable to emit light when in at least one of the first and second positions, and wherein the first and second axes are transverse to each other.

2. The assembly as set forth in claim 1 further including a third light module attached to the second carrier and spaced apart from the second light module, and wherein the third light module is movable with the second carrier and the second light module in unison axially relative to the second axis between the first and second positions.

3. The assembly as set forth in claim 2 wherein the second light module does not operate to emit light when in the first position and the third light module is operable to emit light when in the first position, and the second light module is operable to emit light when in the second position and the third light module does not operate to emit light when in the second position.

4. The assembly as set forth in claim 2 wherein the second light module includes a first body and a first light emitting diode secured to the first body and emits light to light the first body when the second light module is in one of the first and second positions, and the third light module includes a second body and a second light emitting diode secured to the second body and emits light to light the second body when the third light module is in one of the first and second positions.

5. The assembly as set forth in claim 2 further including a fourth light module supported by the housing such that the fourth light module is stationary relative to the housing, and wherein the second light module is disposed closer to a first segment of the fourth light module when in the first position than when in the second position, and wherein the fourth light module defines an opening, with the third light module disposed in the opening when the second and third light modules are in the first position, and the second light module is disposed in the opening when the second and third light modules are in the second position.

6. The assembly as set forth in claim 1 further including a housing configured for attachment to a structure of a vehicle, wherein the first and second carriers are movable relative to the housing.

7. The assembly as set forth in claim 6 further including a lens attached to and supported by the housing, and the lens cooperates with the housing to define an interior region, with the first and second light modules disposed within the interior region.

8. The assembly as set forth in claim 7 wherein the lens includes a face aligning with the first light module, and the first light module is disposed closer to the face of the lens when in the use position than when in the storage position, and the first light module is disposed farther from the face of the lens when in the storage position than when in the use position.

9. The assembly as set forth in claim 7 wherein the first light module includes a plurality of first light modules each attached to the first carrier and stacked generally in a row relative to each other along the first carrier, and wherein the first light modules are movable with the first carrier between the use and storage positions, and wherein the first light modules generally align with the lens.

10. The assembly as set forth in claim 7 wherein at least a portion of the second carrier is disposed between the lens and the first light module when the first light module is in the storage position and the second light module is disposed in the first position.

11. The assembly as set forth in claim 7 wherein at least a portion of the second light module is disposed between the first light module and the lens when the first light module is in the storage position and the second light module is in the first position.

12. The assembly as set forth in claim 6 further including a fourth light module supported by the housing such that the fourth light module is stationary relative to the housing, and wherein the fourth light module includes a first segment disposed between the housing and the second light module, and wherein the second light module is disposed closer to the first segment of the fourth light module when in the first position than when in the second position, and the second light module is disposed farther from the first segment of the fourth light module when in the second position than when in the first position.

13. The assembly as set forth in claim 12 wherein the fourth light module includes a second segment spaced from the first segment by a transition segment, and wherein the second segment defines an opening, with a third light module disposed in the opening of the second segment when the second and third light modules are in the first position, and the second light module is disposed in the opening of the second segment when the second and third light modules are in the second position.

14. The assembly as set forth in claim 12 wherein at least a portion of the first light module is disposed between the second light module and the first segment of the fourth light module when the first light module is in the use position and the second light module is in the second position.

15. The assembly as set forth in claim 12 wherein the fourth light module defines an opening, with the second light module aligning in the opening when the second light module is in the second position.

16. The assembly as set forth in claim 1 further including a first motor coupled to the first carrier and configured to move the first light module and the first carrier between the use and storage positions.

17. The assembly as set forth in claim 1 further including a second motor coupled to the second carrier and configured to move the second light module and the second carrier between the first and second positions.

18. The assembly as set forth in claim 1 wherein the second light module does not operate to emit light when in the other one of the first and second positions.

19. A light assembly comprising:
a housing;
a lens supported by the housing and cooperating with the housing to define an interior region;
a first carrier disposed within the interior region;
a first light module disposed within the interior region and attached to the first carrier such that the first carrier and the first light module are movable in unison between a use position in which the first light module is operable to emit light and a storage position in which the first light module does not operate to emit light;
a second carrier disposed within the interior region;
a second light module disposed within the interior region and attached to the second carrier such that the second carrier and the second light module are movable in unison between a first position when the first light module is in the storage position and a second position when the first light module is in the use position;
a third light module disposed within the interior region and attached to the second carrier to position the second and third light modules apart from each other, and wherein the third light module is movable in unison with the second light module between the first and second positions;
wherein the second light module does not operate to emit light when in the first position and the third light module is operable to emit light when in the first position, and the second light module is operable to emit light when in the second position and the third light module does not operate to emit light when in the second position; and
wherein the second and third light modules are disposed between the lens and the first light module when the first light module is in the storage position and the second and third light modules are disposed in the first position.

20. The assembly as set forth in claim 19 further including a fourth light module disposed within the interior region and supported by the housing such that the fourth light module is stationary relative to the housing, and wherein the second light module is disposed closer to a first segment of the fourth light module when in the first position than when in the second position, and the second light module is disposed farther from the first segment of the fourth light module when in the second position than when in the first position, and wherein the fourth light module defines an opening, with the third light module disposed in the opening when the second and third light modules are in the first position, and the second light module disposed in the opening when the second and third light modules are in the second position.

* * * * *